United States Patent [19]

Aubry et al.

[11] Patent Number: 5,454,693
[45] Date of Patent: Oct. 3, 1995

[54] BLADE MADE OF THERMOPLASTIC COMPOSITE, IN PARTICULAR FOR DUCTED TAIL ROTOR OF A HELICOPTER, AND ITS METHOD OF MANUFACTURE WITH INJECTION STEP

[75] Inventors: Jacques A. Aubry, Cabries; René L. Coffy, Sausset Les Pins, both of France

[73] Assignee: Eurocopter France, Merignane Cedex, France

[21] Appl. No.: 165,861

[22] Filed: Dec. 14, 1993

[30] Foreign Application Priority Data

Dec. 23, 1992 [FR] France .................................. 92 15608

[51] Int. Cl.⁶ .................................................. B64C 27/48
[52] U.S. Cl. .................. 416/134 A; 416/168 R; 416/226; 416/230; 416/239; 29/889.71; 264/250; 264/257; 264/261; 264/275
[58] Field of Search ................ 416/168 R, 226, 416/229 R, 230, 239, 134 R, 134 A; 29/889.21, 889.6, 889.71, 889.72; 264/250, 255, 257, 261, 265, 267, 275

[56] References Cited

U.S. PATENT DOCUMENTS

| | | | |
|---|---|---|---|
| 3,594,097 | 7/1971 | Mouille et al. .................... | 416/134 A |
| 4,299,538 | 11/1981 | Ferris et al. ...................... | 416/134 A |
| 4,626,172 | 12/1986 | Mouille et al. . | |
| 4,626,173 | 12/1986 | Mouille et al. . | |
| 4,639,284 | 1/1987 | Mouille et al. . | |
| 4,815,940 | 3/1989 | LeShane et al. ................... | 416/241 A |
| 4,892,462 | 1/1990 | Barbier et al. . | |
| 4,990,205 | 2/1991 | Barbier et al. . | |
| 5,042,968 | 8/1991 | Fecto .................................. | 416/226 |
| 5,074,753 | 12/1991 | Covington et al. ................ | 416/229 R |
| 5,375,324 | 12/1994 | Wallace et al. .................... | 29/889.21 |
| 5,378,109 | 1/1995 | Lallo et al. ........................ | 416/226 |

FOREIGN PATENT DOCUMENTS

| | | |
|---|---|---|
| 0212724 | 3/1987 | European Pat. Off. . |
| 0296014 | 12/1988 | European Pat. Off. . |
| 0396456 | 11/1990 | European Pat. Off. . |
| 1443155 | 5/1965 | France . |

OTHER PUBLICATIONS

Design Engineering—Jul. 1987—232—London—pp. 49–51.

Primary Examiner—Edward K. Look
Assistant Examiner—Christopher Verdier
Attorney, Agent, or Firm—Larson & Taylor

[57] ABSTRACT

The blade has its lower-surface and upper-surface skins of its shell, its front and rear filling bodies and its spar made of a composite material having the same thermoplastic matrix, preferably made of PEEK, reinforced preferably with carbon fibres. The spar is extended outside the shell by an integrated rooting part with linkage attachment, in a loop or laminate, in the same thermoplastic composite. The method consists in assembling the spar with the skins, after manufacturing these components in the form of prefabricated elementary pieces, by injecting under pressure a fluidized thermoplastic composite with short reinforcing fibres moulding the filling bodies.

19 Claims, 7 Drawing Sheets

BLADE MADE OF THERMOPLASTIC COMPOSITE, IN PARTICULAR FOR DUCTED TAIL ROTOR OF A HELICOPTER, AND ITS METHOD OF MANUFACTURE WITH INJECTION STEP

FIELD OF THE INVENTION

The invention relates to a blade whose essential elements are made of a composite material with a matrix of synthetic rigidifying resin reinforced with inorganic or organic fibres with high mechanical strength.

In an advantageous application, such a blade is intended to equip a multiblade rotor with variable pitch and with individually dismountable blades, in particular a tail rotor, preferably a ducted tail rotor, of a helicopter.

The invention also relates to a method for manufacturing such a blade.

BACKGROUND OF THE INVENTION

Such blades already known from U.S. Pat. Nos. 4,626,172 and 4,892,462, are of the type comprising:

a composite rigid shell, with aerodynamic profile, elongated longitudinally along the span of the blade, one longitudinal end of which, intended to be turned towards the hub of the rotor, has a blade root, the said shell including at least one layer of reinforcing fibres agglomerated by a matrix made of a synthetic rigidifying resin, at least one spar, at least one part of which is housed substantially longitudinally in the shell, including at least one elongate composite bar of continuous and unidirectional reinforcing fibres agglomerated by a matrix made of a synthetic rigidifying resin, and at least one filling body arranged in the shell between the latter and at least one spar.

Furthermore, in an example of a blade described in U.S. Pat. No. 4,892,462, each filling body is also a composite body, with reinforcing fibres aglomerated by a matrix made of a synthetic rigidifying resin.

In order to be individually dismountable and with variable pitch, each blade of the aforementioned patents includes a rooting part which is deformable in torsion about an axis substantially parallel to the longitudinal axis of the blade, and by which the latter is attached to the hub of the rotor. This rooting part includes at least one elongate composite torsion bar which longitudinally extends, outside the shell, at least one composite bar of at least one spar by passing through the blade root, which is tubular, the end of the torsion bar of the rooting part which is situated on the side opposite the shell being shaped into a loop surrounding a spool which is fixed removably to the hub by a bolt. In addition, the tubular blade root includes a metallic or composite cuff, the axial ends of which are each surrounded by one of two coaxial flanges allowing clamping and mounting in rotation of the blade root in two coaxial openings made in two walls of the rotor hub, the cuff also having, between these two flanges, a pitch control lever, projecting radially outwards and intended to be articulated to a device for collective control of the pitch of the blades. Inside the cuff, the blade root consists partly of extensions of the layers of fibres agglomerated by resin, constituting the rigid shell of the blade, optionally by extensions of layers of reinforcing fibres which are agglomerated by a synthetic resin, reinforcing the shell in its part close to the blade root, and partly by filling elements and/or layers of fibre fabric or plies of fibres which are agglomerated with synthetic resin in order to reinforce the blade root.

In the two aforementioned patents, all the composite elements, in particular the shell, the spar or spars, the rooting part, at least partially the tubular blade root and, optionally, the filling body or bodies, are made in composite materials based on polymerizable organic matrices consisting of thermosetting synthetic resins, for example epoxy resins. The reinforcing fibres of these composite materials are, for each blade, of different species, and in general of glass, carbon, or alternatively aramid fibres, and these blades may furthermore include certain elements consisting of synthetic, but not composite, materials, such as polyurethane foams.

This causes problems. It may be necessary to use several thermosetting resins on the same blade, each adapted to particular reinforcing fibres, and possibly non-composite synthetic elements. However, these various thermosetting resins must be mutually compatible. Above all, the thermosetting matrices, under the effect of the temperature and/or time, undergo a chemical conversion called polymerization. This reaction creates a modification in the molecular lattice, which becomes three-dimensional, unmeltable and irreversible. During this thermal cycle, these thermosetting matrices pass successively through three steps: liquid, gel, solid. The pieces based on thermosetting matrices adopt their final shape during the rise in temperature, just before gelling of the matrix. For example, for a matrix of the class of polymerizations termed 180° C. polymerizations, this state is obtained at approximately 160° C. Beyond this point, the matrix becomes solid, and the piece has adopted its final shape. This state is irreversible.

This irreversible and unmeltable nature of the state resulting from polymerization is the cause of a number of industrial difficulties of these blades: the reject rate is high, because manufacturing methods involving such polymerization are difficult to employ and sometimes time consuming, and lead to blades being obtained which do not always have the requisite dimensional characteristics. Because of the irreversibility of the polymerization, it is impossible to recycle the rejects, and repairs, for returning components to their standard form, are time-consuming, expensive and difficult, if they are possible at all. The chemical polymerization reaction can lead to the release of toxic gases, and the reactive nature of the products involved raises problems regarding shelf-life and storage of these products. Finally, it is known that composite materials with thermosetting matrices have poor fatigue strength, shock, impact and temperature resistance, and are sensitive to moisture-induced ageing.

SUMMARY OF THE INVENTION

The basic problem of the invention is to overcome the aforementioned drawbacks of blades of the state of the art, and to provide replaceable blades, with improved reliability and reduced manufacturing and operational costs.

Another object of the invention is to provide a blade in which the structure and production of the tubular blade root are greatly simplified compared to the examples described in U.S. Pat. No. 4,892,462.

For this purpose, the invention provides a blade of the type described in U.S. Pat. No. 4,892,462 and presented hereinabove, and which is characterized in that the resin of the matrices of the shell, of each filling body and of each bar of each spar is a thermoplastic resin, and in that each filling body consists of a composite material with short reinforcing fibres agglomerated by the said thermoplastic resin, which composite material joins the shell to each part of each spar housed in the shell.

Pieces based on thermoplastic matrices adopt their final shades at the instant of melting of the matrix, over a temperature range of approximately 20° C. below the melting temperature proper. On cooling, the matrix returns to its initial solid state, and the piece retains its final shape. This phenomenon is reversible.

The conversion of composite materials with thermoplastic matrices, by simply melting or softening them under the effect of heating, and without chemical alteration, allows higher manufacturing turnover of blades produced using these materials. This is even more the case since the polymerization which the composites with thermosetting matrices undergo, after draping and setting in a mould as in the methods described in the two aforementioned patents, may last 4 to 90 hours, depending on the nature and/or the thickness of the composites. In contrast, composites with thermoplastic matrices, which have no chemical or exothermic reaction during their conversion, whatever their thickness, can be employed rapidly and reversibly by an elementary method which, reduced to its simplest form, consists in heating these composites to melt the matrix, in pressing these composites to compact them and/or shape them, and then in cooling them to consolidate their matrix. These thermoplastic composites can therefore be converted with high turnover. Their reversible nature, as mentioned hereinabove, allows for repair, by heating and reshaping, of blades not in accordance with the specifications, for example the dimensional specifications, as well as for recycling the materials used. This results in a decrease in rejects. Furthermore, the matrix adheres to itself when hot. This property is particularly advantageous since it makes it possible not only to carry out localized repairs but also, as explained hereinbelow, to manufacture blades by a method consisting in carrying out, by pressurized injection of a molten composite material with thermoplastic matrix, the linking and assembling of elementary pieces prefabricated by a wide range of conversion and assembly techniques (especially compacting, stamping and pultrusion), starting from semifinished products made from composites with thermoplastic matrices, which are available in the trade.

Furthermore, the absence of chemical reaction and exothermic reaction makes it possible to avoid the problems of air conditioning the workshops for manufacturing the blades and their components, as well as the problems regarding storage and shelf-life of the materials in question.

All these factors contribute to a reduction in the manufacturing and operational costs of the blades.

For producing the blades according to the invention, a thermoplastic resin selected is advantageously a polyetheretherketone (PEEK) resin, and the reinforcing fibres, in particular of the shell, of the spar or spars, and of the filling body or bodies, are chosen from carbon or glass fibres, but, preferably, are all of the same nature, and in particular made of carbon.

Thermoplastic composites called "PEEK/carbon" are thus advantageously used, which, compared to the thermosetting composites of the blades of the state of the art, additionally have the advantages of good general static mechanical behaviour, and better fatigue strength, good tolerance to damage and a high resistance to the environment, and in particular insensitivity to moisture-induced ageing, very good resistance to temperature, as well as to shocks and impacts.

Furthermore, the choice of a PEEK matrix makes it possible to obtain good creep behaviour and improves the fatigue strength, which is at least twice as great as that of the various other known high-performance thermoplastic matrices which are used for producing composite materials in other applications. The choice of one and the same PEEK resin as the matrix, and of reinforcing fibres solely made of carbon, or possibly solely made of glass, for producing the various composite elements of the blade avoids any disparity with regard to the agglomeration resins and any risk of incompatibility between the various constituents, in contrast to the blades described in U.S. Pat. No. 4,892,462, in which each thermosetting resin used is adapted to the nature of the reinforcing fibres, made of glass, carbon or aramid, which it agglomerates, as well as to the nature of the synthetic material or materials, for example the polyurethane foam, with which it is placed in contact.

PEEK/carbon thermoplastic composites therefore have advantages of their behaviour in use which result from remarkable thermomechanical properties, at least of the same order of magnitude, but often even superior to those of numerous composite materials with thermosetting matrices used for producing the blades of the state of the art.

A reduction in the manufacturing and maintenance costs is thus achieved, as well as an improvement in the blades according to the invention compared to those of the state of the art.

A method of manufacturing the blade represented hereinabove is also a subject of the invention.

The method of manufacturing a blade according to the invention, in which the composite shell consists of a lower-surface skin and of an upper-surface skin which are laminated, is characterized in that it comprises the following steps, consisting:

in producing each of the laminated skins and spars of thermoplastic composite of the blade in the form of a prefabricated elementary piece, in arranging the prefabricated elementary pieces in an injection and pressurized assembly mould, comprising a lower mould part and an upper mould part including complementary internal impressions, having respectively the shape of the lower-surface part and of the upper-surface part of the blade, such that the said prefabricated elementary pieces occupy, in the mould, the respective positions which they occupy in the blade, in closing the mould and injecting therein, between the said skins, a fluid composite material of short reinforcing fibres embedded in a thermoplastic matrix heated to a melting temperature, in order to form the filling body or bodies and, optionally, the internal reinforcing collar of the blade root, in at least locally melting the matrix of the said prefabricated elementary pieces arranged in the mould, in their parts in contact with the fluid composite material, in cooling the mould to solidify the thermoplastic matrix of the injected composite material and of the said elementary pieces, and rigidify the combination thus assembled of the elementary pieces and of the injected body or bodies, and in releasing the blade thus obtained from the mould.

In order to carry out the injection, the composite material with short reinforcing fibres embedded in a molten thermoplastic matrix is advantageously obtained by heating, until melting the said matrix, granulates of short fibres contained in the dry state in the said matrix.

Furthermore, in order to profit from the heat of the material injected to obtain local melting of the matrix of the prefabricated pieces without the mould cooling the material injected too greatly, the method advantageously furthermore consists in heating the said mould to a temperature lower than the melting temperature of the thermoplastic matrix during the injection, and in at least locally melting the matrix of the said elementary pieces by contact with the said fluid composite material injected into the mould.

The various elementary pieces, prefabricated by pultrusion or compacting and stamping, in particular, may be produced in the form of rigid elements having the appearance of board, or semirigid elements, having the appearance of sheets or plates, without tackiness, possibly starting from composite thermoplastic semifinished products available in the trade, such as fabrics or plies of continuous or long unidirectional glass fibres, or preferably carbon fibres, agglomerated by a thermoplastic resin, preferably a PEEK resin, or of plates obtained by superimposing and compacting several layers of such fabrics or such plies.

BRIEF DESCRIPTION OF THE DRAWINGS

The invention will be better understood, and other characteristics and advantages of the invention will emerge, on reading the description which is given below of one embodiment, described by way of non-limiting example and with reference to the attached drawings, in which.

DESCRIPTION OF THE PREFERRED EMBODIMENT

The blade 1 in FIGS. 1 to 8 has its main blade section or profiled part 2, of substantially constant chord, which is extended, on the side opposite the blade tip 3, by a tubular blade root 4, passed through by a rooting part 5, by which the blade 1 is intended to be connected to a rotor hub (not shown), and which consists of a part external to the main blade section 2, of a spar 7 extending over the entire span of the blade 1.

In its main blade section 2, the blade 1 comprises:

a rigid shell 6, having the shape of the desired aerodynamic profile, and elongated longitudinally along the span, the spar 7, a straight part of which is longitudinally housed in the shell 6, along the span, and which is substantially centred on the longitudinal axis A—A of the blade, which is the axis for changing the pitch of the blade, approximately 40% along the chord from the leading edge 8 of the blade, a front filling body 9 housed in the shell 6, between the spar 7 and the leading edge 8, and a rear filling body 10 housed in the shell 6, between the spar 7 and the trailing edge 11 of this blade.

In its main blade section 2, the blade may also comprise a cap (not shown) made of titanium or stainless steel, for protecting the leading edge 8.

Figure 3:
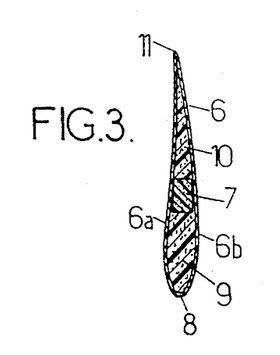
FIGS. 3 to 7 are views in cross-section, respectively along III—III, IV—IV, V—V, VI—VI and VII—VII in FIG. 2.
Figure 4:
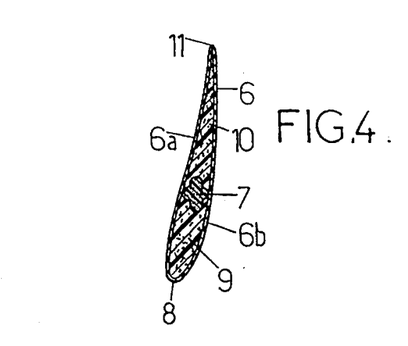

The part of the spar 7 housed in the shell 6 has a cross-section of substantially rectangular shape, in which the longest dimension points along the chord of the blade, or is contained substantially in the plane of rotation of the blade and perpendicular to the longitudinal axis A—A, at least in the spar 7 part close to the blade root 4 (see FIGS. 3 and 5), although this spar 7 part may have a rectangular section as far as the blade tip 3. However, as shown in FIG. 4, and at least in the vicinity of the blade tip 3, the spar 7 has a cross-shaped section. Since the shell 6 consists of a lower-surface skin 6a and of an upper-surface skin 6b, which each extend from the leading edge 8 to the trailing edge 11, the cross-shaped section of the spar 7 makes it possible to stabilize the skins 6a and 6b on the two extreme faces of the spar 7 which are directly facing these skins 6a and 6b, when injecting and in assembling the various components of the blade, as described hereinbelow with reference in particular to FIGS. 32 to 39. Whether its section is substantially rectangular or cross-shaped, the spar 7 is not twisted along the span, and about the pitch-changing axis A—A, which is favourable for its manufacture whilst allowing it to be given the requisite stillnesses. On the other hand, the profiled section of the skins 6a and 6b, as well as of the front 9 and rear 10 filling bodies is progressively twisted about the axis A—A of the blade, in order to give the latter the desired twisting law, from the portion of the main blade section 2 adjacent to the root 4 as far as the blade tip 3, as represented in FIGS. 3 and 4. Thus, the presetting of the blade 1 is very easy to create with respect to the plane of rotation of the rotor.

Each skin 6a or 6b is laminated and consists, from the inside towards the outside of the shell 6, of a stack of a polyetherimide (PEI) resin film, of two layers of plies of continuous and unidirectional carbon fibres which are oriented substantially along the longitudinal axis A—A and agglomerated in a polyetheretherketone matrix commonly called PEEK resin, and of a layer of fabric of carbon fibres which are agglomerated in the same PEEK resin, and in which the directions of the warp and weft yarns are oriented substantially at 45° with respect to the longitudinal axis of the blade. The PEEK resin is a thermoplastic polymer with aromatic structure, containing few hydrogen atoms and having a crystalline structure, a glass transition temperature of approximately 150° C., and a melting temperature of the order of 390° C.

As a variant, each of the skins 6a and 6b may consist of a stack comprising more than one layer of carbon fibre fabric, over the two layers of plies of unidirectional carbon fibres and, optionally, of a film of PEI resin covering the layers of fabric. Whatever the number of layers of fibres forming the laminated stack of each skin 6a or 6b, all these layers are agglomerated by the rigidified PEEK resin, so as to form a box which ensures, after it is filled, the torsional rigidity of the blade 1, the film of PEI resin increasing the resin content at the interface of the shell 6 with its filling and allowing this interface to be homogenized.

The front 9 and rear 10 filling bodies each consist of an injected thermoplastic composite material, with a PEEK resin in which short reinforcing carbon fibres, which fill the matrix to approximately 30% by mass, are embedded.

The spar 7 consists of a single composite and elongate hank of continuous and unidirectional carbon fibres which are oriented longitudinally along the axis A—A and are also agglomerated by the PEEK resin. This hank is arranged, in the shell 2, in an elongate strip of solid section, surrounded by a film of PEI resin, and being, as already stated, of rectangular or cross shape in a portion of varying length, from the edge of the blade tip 3, but always rectangular in its portion adjacent to the blade root 4. By the upper and lower faces of this hank, and the film of PEI resin which homogenizes the interface, the spar 7 is rigidly bound, either directly, or via the injected filling bodies 9 and 10, to the shell 6 in which it is received. This hank is extended axially out of the shell 6, passing through the tubular root 4, and thus forms, by its part which leaves the profiled parts 2, the rooting part 5 of this blade. At the level of the transition region 12 by which the shell 2 connects with the root 4, which extends it axially, the rectangular-section hank of the spar 7 is subdivided into two equal bars 13a and 13b, each also having the shape of a strip of rectangular section, which move progressively away from each other in a direction perpendicular to the longer dimension of their sections, as well as to that of the rectangular part of the spar 7 in the shell 6. At the axial end of the rooting part 5, on the side opposite the root 4, the two bars 13a and 13b of this rooting part 5 each have an end linkage portion 14a or 14b parallel to the end linkage portion of the other bar 13a or 13b, and by which each of the bars 13a and 13b is solidly attached to a common laminate attachment 15 which constitutes the attachment for linking the rooting part 5 to a rotor hub (not shown). The two blade attachment bars 13a and 13b, which are elongated substantially in the longitudinal extension of the shell 6 and of the spar 7 part internal to this shell, each has the same composite structure as the spar 7 part internal to the shell 6, with which they are integral, and each of the bars 13a and 13b can be twisted about its longitudinal axis, so that the rooting part 5 can itself be twisted about the longitudinal axis A—A.

Such a blade, with a rooting part consisting of several elongate composite torsion bars, in which the end portions for linkage to the hub are solidly attached to the same laminate attachment, for linking to a rotor hub whose structure comprises means adapted for retaining such a laminate attachment, is more precisely described in a parallel application, U.S. patent application Ser. No. 08/165,862 of the Assignee Company, which may be referred to for further details on producing the laminate attachment as well as on the structure of the hub and the mounting of the laminate attachment on the hub.

It will be recalled that the laminate attachment 15 comprises a lower laminate element 15a, an upper laminate element 15b and an intermediate laminate element 15c, which are arranged in line above each other, so that the end portion 14a of the lower strip 13a is sandwiched between the lower 15a and intermediate 15c laminate elements, and that the end portion 14b of the upper strip 13b is sandwiched between the intermediate 15c and upper 15b laminate elements. Each of the laminate elements 15a, 15b and 15c consists of a stack of several layers of fabric of carbon fibres which are agglomerated by PEEK resin, and in which the directions of the warp and weft yarns are oriented substantially at 45° with respect to the longitudinal axis of the strip 13a or 13b, or of a stack of several layers of plies of continuous and unidirectional carbon fibres which are agglomerated by PEEK resin, the plies being alternately crossed with each other in the stack, so that the direction of the unidirectional fibres of one ply is substantially perpendicular to the direction of the fibres of the adjacent ply or plies, the orientation of the plies of the stack being such that the unidirectional fibres of the various plies extend substantially at 45° with respect to the longitudinal axis of the bar 13a or 13b. For example, each of the lower 15a and upper 15b laminate elements may consist of the stack of nine layers of fabric or of sixteen plies, or alternatively, as a variant, of a stack comprising layers of fabric and layers of ply. The intermediate laminate element 15c is a stack consisting of the same layers of fabric and/or layers of ply, but in which the thickness is twice that of the lower 15a and upper 15b laminate elements, the intermediate element 15c being for example produced by superimposing two laminate elements such as the lower 15a or upper 15b elements.

Figure 1:
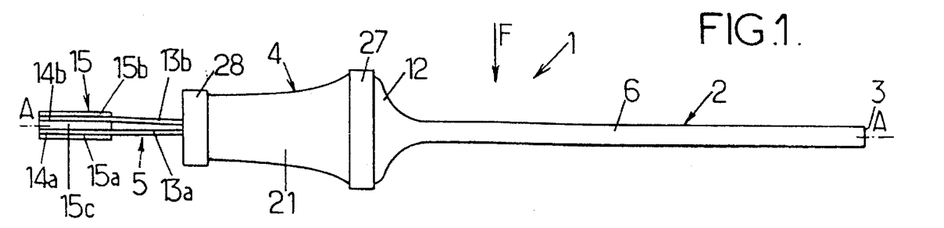
FIG. 1 is a view in side elevation of a blade for a multiblade, variable-pitch, ducted tail rotor of a helicopter.
Figure 2:
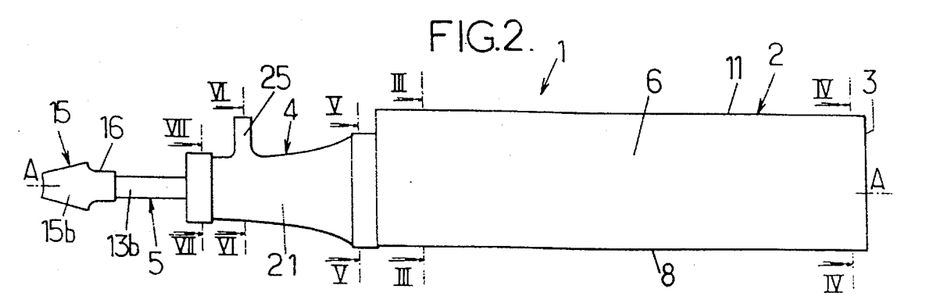
FIG. 2 is a plan view, along the arrow F in FIG. 1, of this blade.
Figures 8, 9:
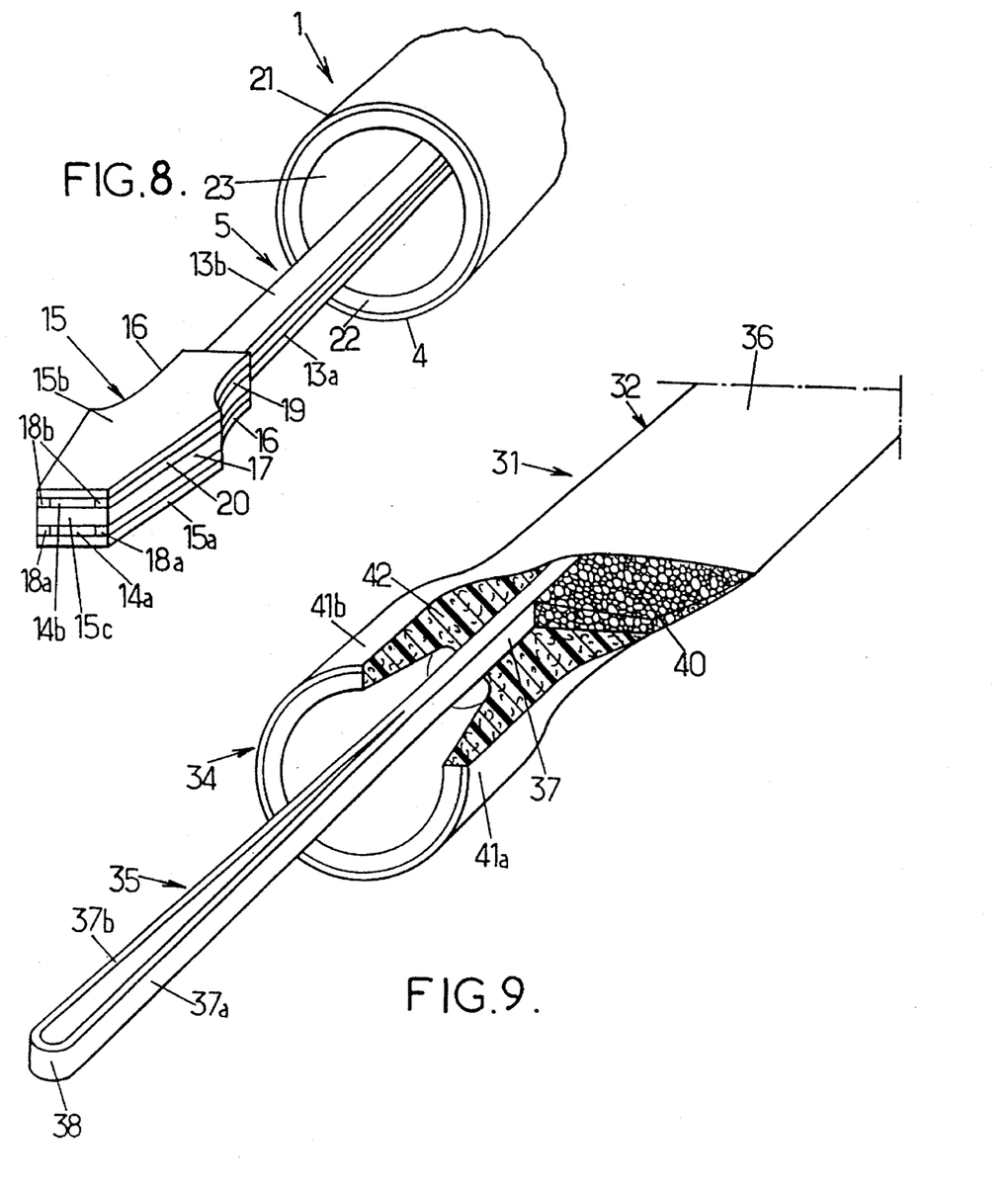
FIG. 8 is a partial perspective view of the blade root, of the rooting part and of the laminate attachment of the blade in FIGS. 1 and 2.
FIG. 9 is a view similar to FIG. 8 of an embodiment variant, in which the spar of the blade has been modified so that its rooting part has a loop attachment, in place of the laminate attachment.

As represented in FIGS. 2 and 8, the three laminate elements 15a, 15b and 15c have, as seen in plan, the same laterally flared shape on the two sides of the end portions 14a and 14b, which are of substantially rectangular shape in the extension and at the end of the strips 13a and 13b.

The flared shape of each laminate element 15a, 15b and 15c with respect to the end portions 14a and 14b is delimited by the side faces of these elements, which project laterally with respect to the end portions 14a and 14b and which have, in the part of each laminate element which is turned towards the shell 6, a concave region 16, with concavity turned laterally on one or other side of the blade and towards the shell 6, whereas in the end part of the laminate elements 15a, 15b and 15c which is turned from the side opposite the shell 6, the side faces of these laminate elements have planar regions 17 which converge towards each other, delimiting on the laminate elements an end part of substantially trapezoidal shape.

In order to fill the space delimited between the parts of two neighbouring laminate elements 15a, 15b and 15c which project with respect to the end portions 14a and 14b, the laminate attachment 15 also comprises four laminate side filling elements, two of which, 18a (see FIG. 8) are each arranged bearing against one of the side faces of the end portion 14a, and sandwiched between the projecting side parts of the lower 15a and intermediate 15c laminate elements, the other two 18b of which are each arranged bearing against one of the side faces of the end portion 14b and sandwiched between the laterally projecting parts of the intermediate 15c and upper 15b laminate elements. The laminate side filling elements 18a and 18b have a laminate structure similar to that of the other laminate elements 15a, 15b, 15c, i.e. of PEEK/carbon composite, and their side face opposite the one by which they are each applied against one of the end portions 14a and 14b also has, like the side faces of the laminate elements 15a, 15b and 15c, a concave region 19, which is in the extension of the concave regions 16 of the laminate elements 15a, 15b and 15c, as well as a planar region 20, which is in the extension of the planar regions 17 of the laminate elements 15a, 15b, 15c and which is therefore convergent with the planar region 20 of the other corresponding laminate side filling element 18a or 18b.

All the laminate elements 15a, 15b, 15c, 18a, 18b of the laminate attachment 15 are solidly attached to the end portions 14a and 14b of the two strips 13a and 13b of the rooting part 5 by the rigidification of the PEEK resin, which agglomerates all the reinforcing carbon fibres, in layers of plies of unidirectional fibres or fabric, which constitute the laminate elements of the attachment 15 as well as the strips 13a and 13b and their end portions 14a, 14b.

In order to facilitate production of the spar 7 with integrated rooting part 5, the single composite hank of the spar 7 is formed by two bars of the same kind, each consisting of a pultruded strip comprising several superimposed plies of continuous and unidirectional carbon fibres which are oriented along the axis A—A of the blade and are agglomerated by the PEEK resin, it being possible for the various superimposed plies of fibres of each strip to be obtained by superimposing an equal number of equal lengths cut out from a tape of PEEK/carbon composite, with unidirectional and longitudinal carbon fibres. The two pultruded strips are held spaced apart over part of their length forming the rooting part 5 using the laminate attachment 15, with which they are solidly attached by their corresponding end, whilst, over the rest of their length, these two pultruded strips are surrounded by a PEI resin film and superimposed, with interposition of three plies of unidirectional and longitudinal carbon fibres which are agglomerated by the PEEK resin, to constitute the part of the spar 7 received in the shell 6.

In use, the centrifugal forces exerted on the blade 1 stress the spar 7 longitudinally, so that its laminate attachment 15 comes to abut, via the concave recesses formed laterally on the two sides by the side faces 16 and 19 of its laminate elements, against bushes, at least one of which is removable to allow individual dismounting of the blade, which bushes are solidly attached to the hub and are each situated on one of the sides of the rooting part 5, extending in a direction substantially perpendicular to the plane of rotation of the blade, which is substantially parallel to the upper and lower long faces of the laminate elements and of the torsion sheets of the rooting part 5.

Figure 5:
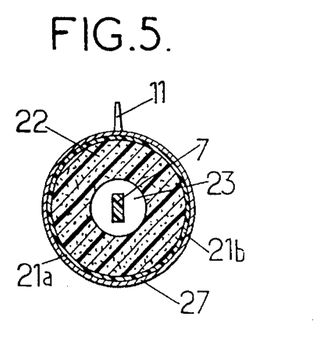
Figure 6:
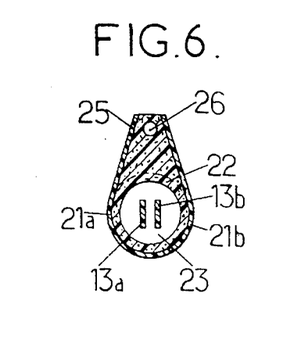
Figure 7:
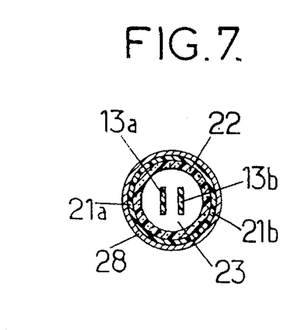

The root 4, represented in section in FIGS. 5 to 7, comprises two complementary half-casings 21a and 21b, each of which has essentially the shape of half a tube, of variable section, cut out axially through a diametral plane, and these two half-casings 21a and 21b are bonded against each other by their longitudinal edges, so as to reconstitute the tube segment, and each consist of an axial extension reinforced by one, respectively, of the two skins 6a and 6b of the shell 6. Each half-casing 21a or 21b is laminated and comprises not only the PEI resin film and the various layers of fabric and plies of fibres which are agglomerated by the PEEK resin which constitute the skin 6a or 6b which it extends, but in addition three additional reinforcing layers, located at this extension, which are for example layers of PEEK/carbon fabric, in which the directions of the warp and weft yarns are, for the one part, substantially parallel to, and, for the other part, substantially perpendicular to the longitudinal axis A—A of the blade, these additional reinforcing layers lying over the other layers of the skin.

In order to rigidify the root 4 by giving it sufficient thickness, these half-casings 21a and 21b are internally reinforced by a tubular collar 22. This collar 22 has an axial and central passage 23, which is passed through by the two strips 13a and 13b of the rooting part 5, in proximity to and at the level of their subdivision from the spar 7 strip in the shell 6, and this passage 23 is delimited by an internal side surface of substantially frustoconical general shape, with a small base turned towards the shell 6. The collar 22 also has an external side surface of general shape which is also substantially frustoconical, but with a long base turned towards the shell 6, and therefore with opposite conicity to that of the internal passage 23. The collar 22, which is surrounded by the half-casings 21a and 21b, the shape of which corresponds to that of the external side surface of the collar 22 against which they are applied, therefore tapers progressively from its end adjacent to the shell 6 to its end turned towards the laminate attachment 15. Like the filling bodies 9 and 10 which it extends in the root 4, the collar 22 is produced by injection from a composite of short reinforcing carbon fibres embedded in the PEEK matrix, which is filled to 30% by mass with the reinforcing fibres.

The half-casings 21a and 21b, solidly attached to each other and to the collar 22, constitute a cuff 21 for controlling the pitch of the blade, which is arranged as a bearing for clamping and rotation of the root 4 on a hub. This cuff 21, seen in FIGS. 1, 2 and 8, has a substantially frustoconical general shape, with the long base turned towards the shell 6, at its internal and external side surfaces. In order to allow its articulation to a device for collective control of the pitch of the blades of a variable-pitch multiblade hub comprising a plurality of blades such as the blade 1, the cuff 21 and the collar 22 include, projecting radially outwards, a pitch control lever 25. This lever 25 is pierced with an opening 26 for housing a ball Joint for linking the collective pitch control device, in a manner described in the aforementioned parallel application, as well as in the aforementioned patents, which may be referred to for further details on this mounting and on the structure of the collective pitch control device.

Figure 14:
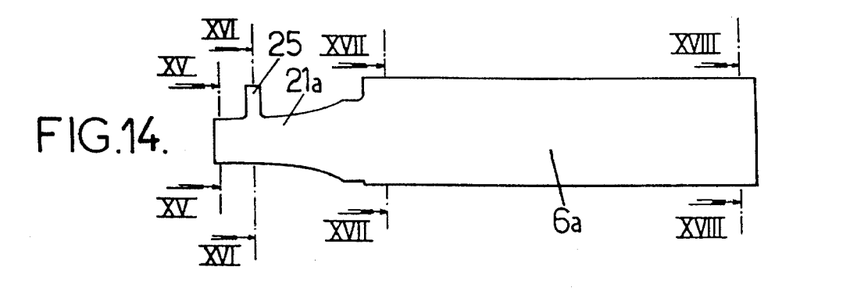
FIG. 14 represents this skin in plan along the arrow F in FIG. 13, FIGS. 15, 16, 17 and 18 represent views in cross-section, respectively along XV—XV, XVI—XVI, XVII—XVII, XVIII—XVIII in FIG. 14.
Figure 15:
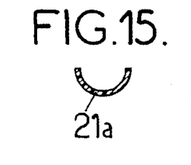
Figure 16:
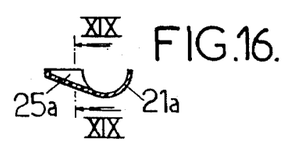

In a heavier variant, this cuff may be a metallic cuff mounted about the half-casings 21a and 21b, as described with reference to FIG. 14 in the aforementioned U.S. Pat. No. 4,892,462, and its mounting may correspond to the representation in FIG. 16 of the same patent, the metallic cuff then being attached by bonding or shrinking on the root of the assembled blade. In a known manner, shrink-mounting is carried out by heating the cuff, fitting it over the blade root, then cooling it.

Finally, the cuff 21 is solidly attached and surrounded, at each of its axial ends, by a ring 27 or 28, made of metal or ceramic, which constitutes a bearing surface for rotation of the cuff 21 on the hub, these rings 27 and 28 being solidly attached to the cuff 21 by bonding or shrinking, or during the phase of injection and assembly of the blade in the method described hereinbelow.

The blade 1 is thus such that all its components, with the exception of the rings 27 and 28 and, possibly, the cuff 21, are made of PEEK/carbon composite, the assembling of the various components and the cohesion of the blade being ensured by the PEEK resin, with very partial assistance from the PEI films.

A variant of this blade is represented in FIG. 9. The blade 31 according to this variant differs essentially from that in FIGS. 1 to 8 only by the structure of its rooting part 35 which is no longer fitted with a laminate attachment but with a rooting part 35 with linkage loop. In this variant, the spar 37 also consists of a hank of continuous and unidirectional reinforcing carbon fibres which are agglomerated by the PEEK resin, and which has two parallel parts bonded to each other along the longitudinal axis of the blade 31 to constitute two bonded spar bars which are received in the shell 36 in the main blade section or profiled part 32 of the blade 31. These bars of the spar 37 are Joined to each other by a substantially flattened loop part which constitutes the rooting part 35 proper, and of which the end external to the shell 36 is rolled into a loop 38 and forms a loop attachment for linkage to the hub (not shown) to surround a bush by which the blade 31 is intended to be individually and removably attached to the hub by a bolt, in the manner described in the aforementioned patents. This loop attachment 38 is connected to the two spar bars 37 received in the shell 36 by two hank parts forming two attachment torsion bars 37a and 37b of the rooting part 35. For the rest of the structure of this blade 31, it also has in the shell 36 a front filling body (not shown) and a rear filling body 40 which are injected bodies made from PEEK/carbon composite with short reinforcing fibres, the shell 36 is produced like the shell 6 of the blade 1, the root of the blade 34, represented in FIG. 9 without its rotation rings, also comprises laminated and reinforced half-casings 41a and 41b extending the laminated lower-surface and upper-surface skins of the shell 36, with three additional layers of reinforcing PEEK/carbon fabric to constitute a pitch control cuff, and an internal reinforcing collar 42, produced by injection from PEEK/carbon composite with short reinforcing fibres.

The method of manufacture of the blade in FIGS. 1 to 8 comprises an essential step of assembling by pressurized injection which makes it possible to assemble certain PEEK/carbon composite components of the blade, after these components have been prefabricated in the form of elementary pieces, by injection of a fluidized thermoplastic composite material, with PEEK matrix and short reinforcing carbon fibres embedded in the matrix, which constitutes the other PEEK/carbon composite components of the blade and binds the prefabricated elementary pieces together.

In order to produce each lower-surface or upper-surface skin 6a or 6b in the form of a prefabricated PEEK/carbon composite elementary piece, the first step is to produce a plate 50 (see FIG. 10) constituted by superimposing the same number of rectangular planar layers in the semirigid state of carbon fibres agglomerated by the PEEK resin as there are layers in the skins 6a and 6b, these layers being of the same kind, that is to say, for the example in question, and from the inside towards the outside of the shell 6, two layers of plies of continuous and unidirectional carbon fibres which are oriented along the width of the plate 50, the direction of which corresponds to the longitudinal direction or span of the shell 6, and which is twice as great as the span of this shell 6, and at least one upper layer of fabric of carbon fibres which are agglomerated by the PEEK resin and in which the directions of the weft and warp yarns are inclined at 45° with respect to the width of the plate 50. The stack also comprises three reinforcing bands 51, of constant width, but, for example, with thickness increasing from one band 51 to the next, from the outermost band to the innermost band of the stack, these bands 51 also being in the semirigid state, and made of fabric of carbon fibres which are agglomerated by the PEEK resin, but in which the directions of the warp and weft yarns are oriented, for the one part, along the width and, for the other part, along the length of the plate 50, these bands 51 extending longitudinally across the central part of the plate 50 which central part is intended to form the half-casing 21a and 21b reinforced extensions of the skins 6a and 6b of the shell 6. On the face of the stack intended to be turned towards the inside of the shell 6, a film of PEI resin is additionally arranged, in order to increase the resin content at the interface with the components internal to the shell 6 and to homogenize this interface.

Figure 10:
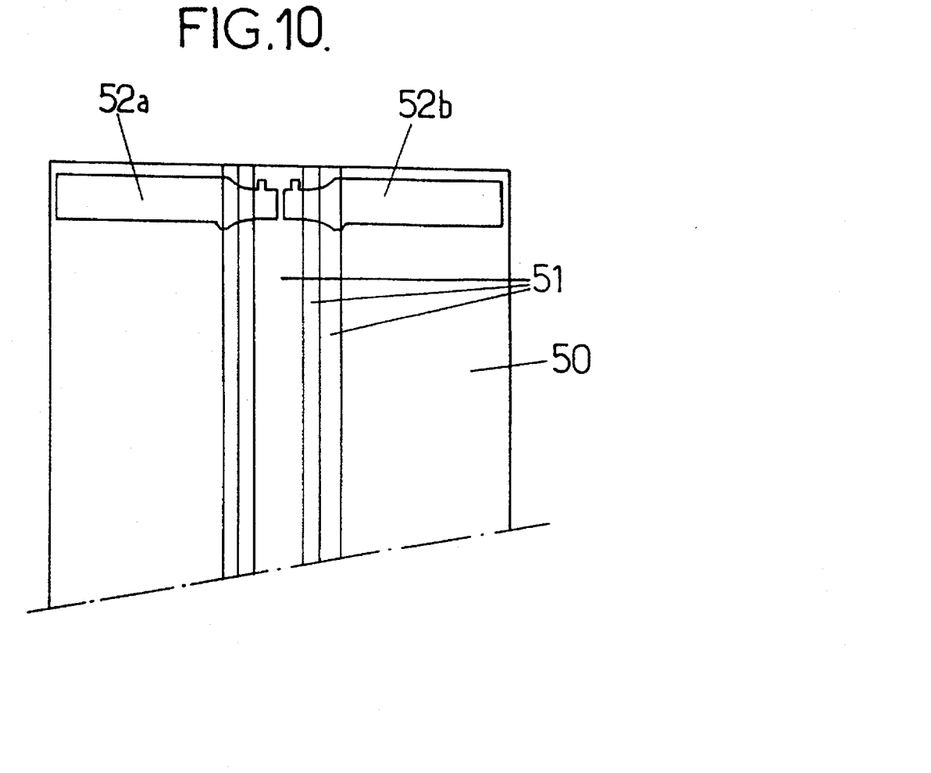
FIG. 10 is a plan view of a precompacted plate from which panels for the lower-surface and upper-surface skins of the shell of the blade in FIGS. 1 to 8 are cut out, FIGS. 11 and 12 diagrammatically represent two steps in producing the lower-surface and upper-surface skins by stamping, FIG. 13 diagrammatically represents a stamped skin in side elevation.

The stack of these layers and bands is heated to a melting temperature of the PEEK matrix, of the order of 400° C., and subjected to low pressure, of the order of 0.1 to 0.5 MPa, in a compacting mould, in order for the PEEK matrix to bind together the various layers and bands of fibres. The stack is then cooled and a precompacted plate 50, essentially made of PEEK/carbon composite in substantially rigid state is obtained by solidifying the PEEK resin, from which plate panels such as 52a and 52b, arranged substantially end-to-end along the width of the plate 50 and turned towards each other by the extensions intended to form the half-casings 21a and 21b of the blade root, are cut out using a fluid Jet, each of these panels 52a and 52b having the shape, developed flat, respectively of the lower-surface 6a and upper-surface 6b skin.

Each flat panel 52a or 52b is then shaped to the form desired for the corresponding lower-surface 6a or upper-surface 6b skin by stamping in a stamping mould.

Figure 11:
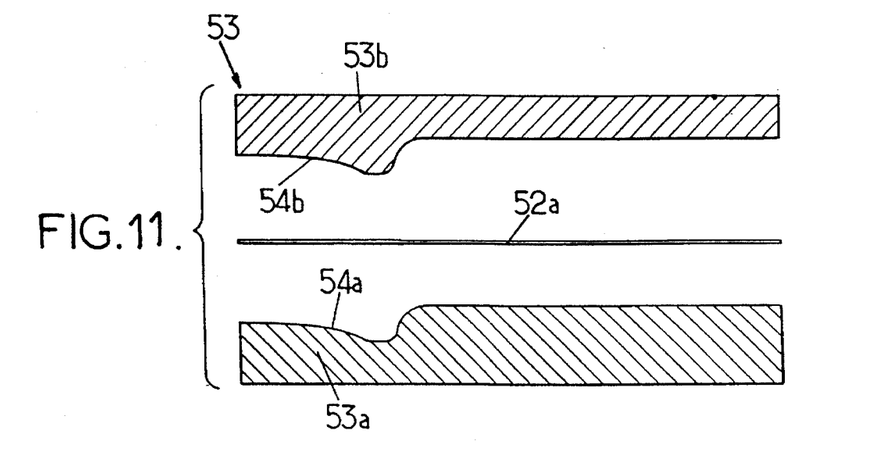
Figure 12:
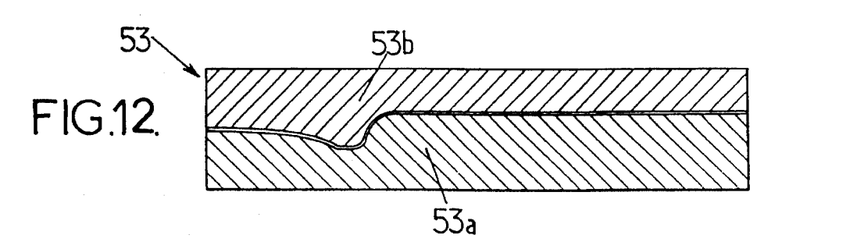

This stamping method is employed as represented in FIGS. 11 and 12, in a stamping mould including a lower mould part 53a, forming a die, and an upper mould part 53b, forming a punch, each having respectively one of two complementary impressions 53a and 53b corresponding to the internal and external shapes of the laminated skin 6a or 6b which this stamping mould 53 makes possible to produce.

Figure 13:
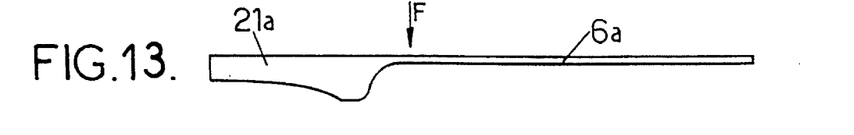
Figure 17:
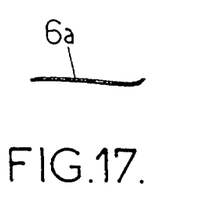
Figure 18:
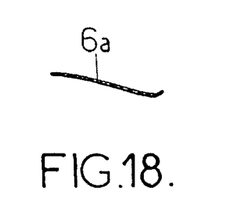
Figure 19:
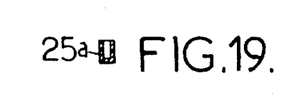
FIG. 19 represents a view in section along XIX—XIX in FIG. 16.

By way of example, the stamping mould 53 in FIGS. 11 and 12 allows shaping of the lower-surface skins 6a. The impression 54a internal to the lower mould part 53a thus corresponds to the external shape of the lower-surface skin 6a, whereas the impression 54b internal to the upper mould part 53b corresponds to the internal shape of this same lower-surface skin 6a. In FIG. 11, the flat panel 52a is arranged between the two mould parts 53a and 53b which are separated from each other and each held at a temperature lower than the melting temperature of the PEEK matrix, for example of the order of 150° C., this flat panel having the same structure as the lower-surface skin 6a but the shape of the latter as developed flat. This panel 52a is arranged in the mould 53 after preheating to a temperature of the order of 400° C., for example using infrared or by passing through a tunnel furnace with pulsed hot air, then the two half-moulds 53a and 53b are closed, as represented in FIG. 12, to shape the lower-surface skin 6a to the desired profile. After cooling in the closed mould 53, the PEEK matrix solidifies, the mould 53 is opened and the lower-surface skin 6a can be released from the mould, as represented in FIGS. 13 and 14. The sections in FIGS. 17 and 18 represent the change in the twisting of this lower-surface skin 6a in the main blade section 2, and the sections in FIGS. 15, 16, 17 and 19 show the half-casing 21a formed in the axial extension of the lower-surface skin 6a, with its half 25a of U-shaped cross-section, of the pitch control lever 25.

The upper-surface skin 6b is made in the same manner by stamping a panel 52b in a stamping mould similar to the mould 53, in which the impressions of the two parts of the mould correspond respectively to the external shape and to the internal shape of this upper-surface skin 6b, as well as its half-casing 21b with its pitch lever half.

Figure 20:
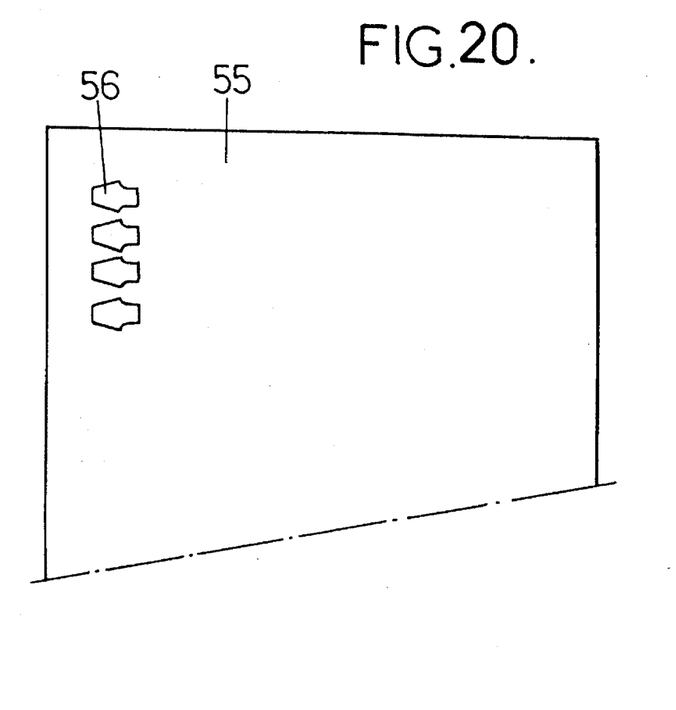
FIG. 20 represents, in plan, a precompacted plate from which laminate elements of the laminate attachment of the blade according to FIGS. 1 to 8 are cut out, FIGS. 21 and 22 diagrammatically represent the steps of the manufacture of the spar with laminate attachment of the blade according to FIGS. 1 to 8, FIGS. 23 and 24 diagrammatically represent, respectively in plan and in side elevation, the manufactured spar.

The PEEK/carbon composite elementary piece constituting the spar 7 with an integrated rooting part 5 having a laminate attachment 15 is made in the following manner. A plate 55 is produced (see FIG. 20) by stacking, for example, sixteen rectangular layers in the rigid state of plies of continuous and unidirectional carbon fibres which are agglomerated by the PEEK resin, the plies being crossed from one layer to the next in the stack so that the orientation of the fibres of one layer is perpendicular to that of the fibres of the neighbouring layer or layers in the stack, and that the orientations of the fibres of the various plies are substantially at±45° with respect to the direction of the length or of the width of the plate 55. The stack is then compacted in a compacting autoclave, in which the stack is heated to a temperature of the order of 400° C. to melt the PEEK resin, and it is subjected to a pressure of the order of 0.1 to approximately 0.5 MPa, exerted by a press in the autoclave or by the "vacuum bag" technique, that is to say that the stack is arranged in a leaktight bladder made of a polyimide film, for example of brand name UPILEX S, which withstands the melting temperature of the PEEK matrix, this bladder being connected to a reduced pressure source which makes it possible to create a relative vacuum in the bladder in order to compact the stack. Next, after cooling and solidifying the PEEK resin, which solidifies all the layers of the stack, a precompacted plate 55 is obtained, from which laminate elements 56 are cut out using a fluid jet, each of which elements has a shape and a structure allowing it to constitute the lower 15a or upper 15b laminate element of the laminate attachment 15, while two superimposed laminate elements 56 are necessary to construct the intermediate laminate element 15c of this laminate attachment 15.

As a variant, the plate 55 may be constructed by compacting nine layers of fabric of carbon fibres which are agglomerated by the PEEK resin, in which the directions of the weft and warp yarns are inclined at±45° with respect to the length or the width of the plate 55.

The laminate side filling elements 18a and 18b of the laminate attachment 15 are also cut out using a fluid jet from the plate 55, or, if necessary, from another similar precompacted plate with suitable thickness.

The actual spar 7 consists essentially of two strips produced by pultrusion from continuous and unidirectional carbon fibres which are agglomerated by the PEEK resin. Each strip is a pultruded profiled section manufactured by a known method and using a known device, the essential characteristics of which are summarized hereinbelow.

It is known that pultrusion is a manufacturing method using extrusion by drawing which is specific to organic-matrix composite materials and which makes it possible to produce solid or hollow profiled sections continuously and with constant section. This method essentially consists in pulling continuous reinforcing fibres, in the form of carbon rovings, through a resin impregnation tank, then a heated extrusion die, in which the shaping by compacting of the pultruded profiled section of PEEK resin enclosing the carbon rovings is carried out. These pultruded profiled sections may have high levels, of the order of 40 to 60%, of reinforcing fibres by volume, and therefore good mechanical performance in the longitudinal direction. Pultrusion also makes it possible to mould laminated profiled sections continuously, the profiled sections being worked by drawing plies of impregnated fibres through an extrusion die. When passing through the heated extrusion die, the plies are compacted and form, on leaving, a profiled section with precise dimensions and a good surface texture. This method therefore makes it possible to use solid profiled sections from PEEK resin and continuous and unidirectional carbon fibre reinforcement constituting the sheets used for producing the spar 7 of the blade. The pultrusion line allowing these profiled sections to be produced is conventional, and is therefore not described in detail.

Such pultruded profiled sections, with excellent dimensional stability, have remarkable rigidity as well as good absorption of the vibrations when they are subjected to fatigue stresses. These pultruded profiled sections are therefore appropriate to be used as spar strips in blades which are mechanically and thermally stressed to a high degree over long lifetimes.

Figure 21:
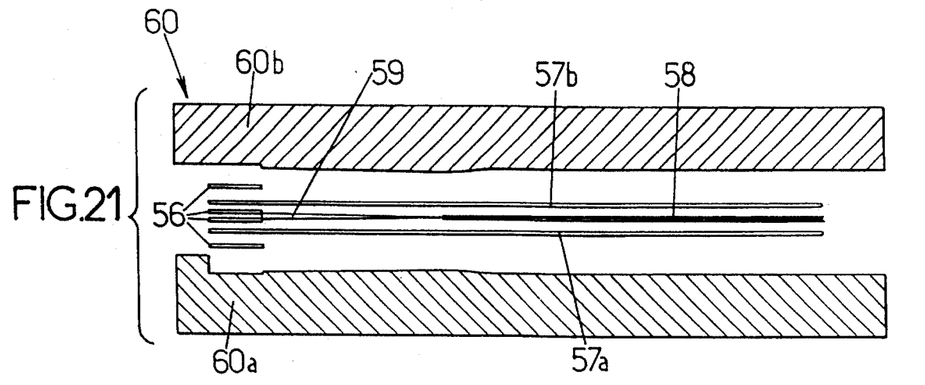

In this example, the pultruded profiled section of each strip is produced from tapes or plies of continuous, unidirectional and longitudinal carbon fibres which are agglomerated by the PEEK resin, by passing through an extrusion die heated to a temperature of approximately 400° C. to melt the PEEK matrix. Each of the two identical pultruded strips 57a and 57b of the spar 7 consists for example of a pultruded profiled section with sixteen plies of such fibres. As represented in FIG. 21, the pultruded strips 57a and 57b are arranged in a mould 60 for compacting the spar 7, which comprises a lower mould part 60a and an upper mould part 60b which each have an internal impression respectively having the shape of the lower part and the upper part of the manufactured spar 7, except at the laminate attachment 15, for which the corresponding impression is essentially made in the lower part of the mould 60a. The strips 57a and 57b are superimposed, along the part of their length which is to be received in the shell 6, with the inter-position between the three plies 58, in the semirigid state, of continuous and unidirectional carbon fibres which are oriented longitudinally and are agglomerated by the PEEK resin.

Figure 22:
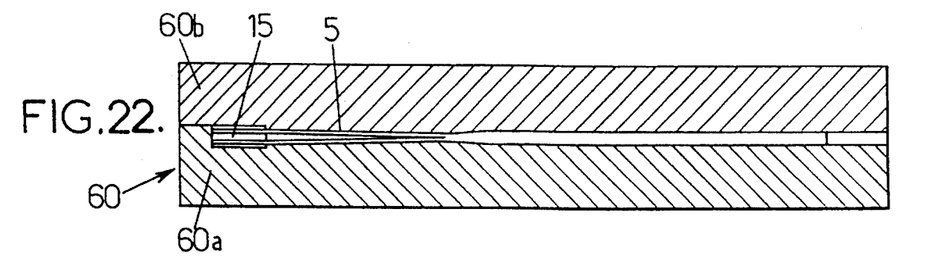
Figure 23:
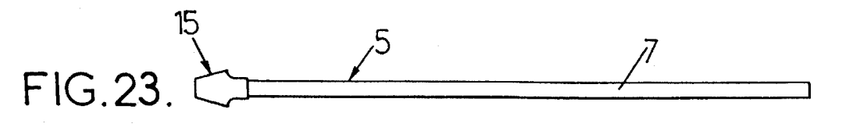
Figure 24:
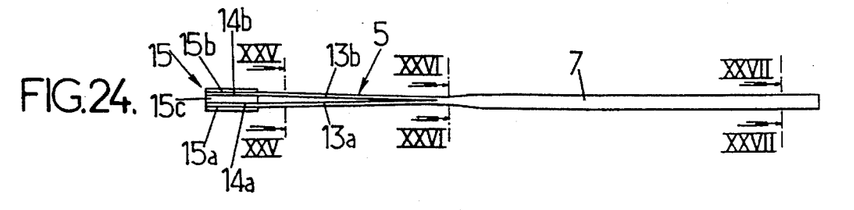
Figure 25:
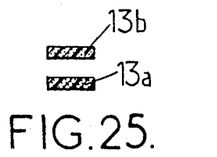
FIGS. 25, 26 and 27 represent views in cross-section respectively along XXV—XXV, XXVI—XXVI and XXVII—XXVII in FIG. 24, FIGS. 28 and 29 represent, in longitudinal section, the fitting of a positioning tool on the spar in FIGS. 23 and 24.
Figure 26:
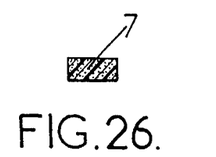
Figure 27:
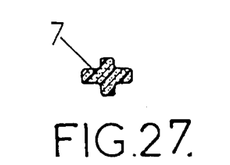
Figure 28:
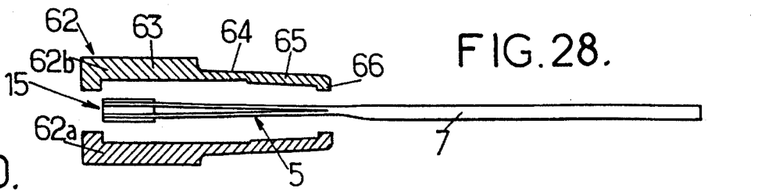

Before fitting the strips 57a and 57b and plies 58 in the mould 60, a film of PEI resin, which is approximately 0.1 mm thick, is fitted in the part of the impression of the lower part of the mould 60a which corresponds to the spar 7 part housed in the shell 6. Then, after stacking the strip 57a, the plies 58 and the sheet 57b in this lower part of the mould 60a, the film of PEI resin is folded over the strips 57a, 57b and the plies 58 so as to envelope the constituent elements of the spar part received in the shell 6. This PEI film is intended to increase the resin content at the interface between the spar 7 and the other constituents of the shell 6. In order to hold the parts of the length of the two strips 57a and 57b which are to constitute the torsion strips 13a and 13b of the rooting part 5 away from each other, a steel wedge-shaped tool 59 is interposed between these parts of the strips 57a and 57b. Then each of the end portions of these separated parts of the strips 57a and 57b, which end portion is intended to form the end linkage portion 14a or 14b of the corresponding torsion strip 13a or 13b, is sandwiched between two prefabricated laminate elements 56, as cut out from the precompacted plate 55 in FIG. 20. The two laminate elements 56 thus directly superimposed from each other, between the end portions of the separated parts of the two strips 57a and 57b, are arranged directly behind the steel wedge 59, on the faces of which an aerosol mould release agent, for example of the type known under the name "FREKOTE", is vaporized before fitting. This layer of mouldrelease agent has the effect of facilitating withdrawal of the removable tool consisting of the steel wedge 59 after compacting of the spar. This compacting is carried out by closing the mould, as represented in FIG. 22, while all the composite elements contained in the mould are heated to a temperature of the order of 400° C. to melt the PEEK matrix, and these components are simultaneously subjected to a pressure of the order of 0.6 MPa. The three plies of unidirectional fibres 58, which are arranged facing the end of the removal wedge 59, and which are integrated in the spar 7 by the compacting operation, have the role of avoiding any deformation in thickness of the strips 57a and 57b of the spar, at the end of the metal wedge 59, because this end cannot have strictly zero thickness. Thus, the PEEK matrix solidly attaches the four laminate elements 56 to the ends of the separated parts of the two strips 57a and 57b of the spar, and solidly attaches the two laminate elements 56 which are directly superimposed to constitute the intermediate laminate element 15c of the laminate attachment 15, and also solidly attaches together the superimposed parts of the two strips 57a and 57b and the three intermediate plies of fibres 58. After cooling and solidifying the PEEK resin, the mould 60 is opened and the spar 7 which is compacted and manufactured in a single piece is released from the mould and has the structure represented in FIGS. 23 and 24 and such as already described hereinabove. In particular, each of the two pultruded strips 57a and 57b of the spar 7 constitutes, on the one hand, a spar bar received in the shell 6 and solidly attached to the corresponding bar of the other strip, and, on the other hand, a blade attachment bar 13a or 13b, connected to the other by its linkage end portion 14a or 14b via the common laminate attachment 15.

Figures 31, 32:
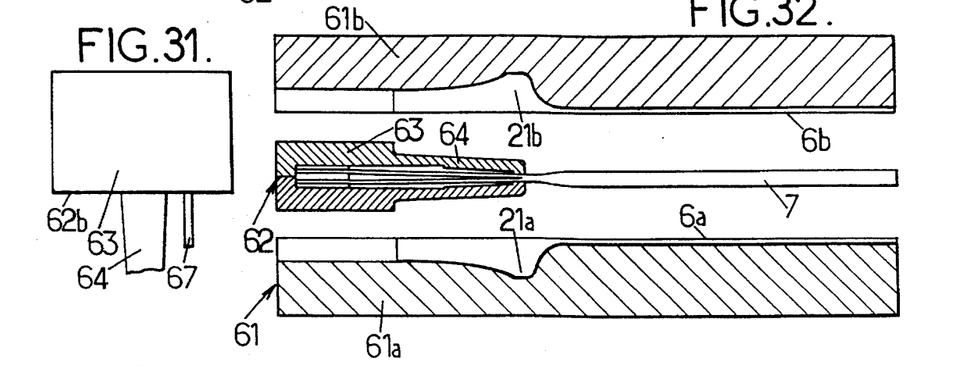
FIG. 31 is a view along the arrow G in FIG. 30.
FIG. 32 represents, in longitudinal section, the fitting of the skins and of the spar with its positioning tool in the injection and assembly mould.

With the two skins 6a, 6b and the spar 7 having been produced in the form of prefabricated elementary pieces made of thermoplastic PEEK/carbon composite, these pieces are arranged in a mould for pressurized injection assembly of the blade, diagrammatically represented in FIG. 32, this mould 61 comprising a lower mould part 61a and an upper mould part 61b which include complementary internal impressions having, respectively, the shape of the lower-surface part and of the upper-surface part of the blade, the prefabricated elementary pieces being arranged in this mould such that they occupy in the latter the respective positions which they occupy in the blade 1.

For this purpose, it is necessary beforehand to arrange the spar 7 in a positioning tool 62, as represented in FIGS. 28 to 31. This tool 62 comprises a lower part 62a and an upper part 62b which are complementary and symmetrical with each other, so as to envelope only the rooting part 5 and the laminate attachment 15 of the spar 7, leaving free the spar 7 part intended to be received in the shell 6. This lower 62a or upper 62b part comprises a base 63 of substantially parallelepipedal shape, with an internal recess housing, without clearance, the respectively lower or upper half of the laminate attachment 15, and, with clearance, the respectively lower or upper half of the rooting part 55, and each base 63 is extended axially by an end-piece 64, having the shape of a substantially frustoconical half-tube of circular section. In its part adjacent to the base 63, the recess internal to the end-piece 64 extends the recess internal to the base 63 and surrounds, with clearance, the respectively upper or lower half of the rooting part 5. On the other hand, in its part situated on the side opposite the base 63, the end-piece 64 has an overthickness towards the inside in a portion 65, with internal recess substantially in the shape of a half truncated cone, which surrounds, practically without clearance, the portion of the rooting part 5 where the strips 13a and 13b are separated from each other to a small degree, and which terminates in an end 66 projecting radially inwards, which is applied against the respective lower or upper planar face of the part of the spar 7 where the sheets 13a and 13b come together. In this way, the end-pieces 64 constitute mould inserts for forming the central passage 23 of the root 4 (see FIGS. 5 to 7).

Parallel to the axis of its recess, each base 63 has, in its plane of contact with the other base 63 for closing the tool parts 62a and 62b around the rooting part 5 and its laminate attachment 15, a semicylindrical groove which forms, with the facing groove of the other base 63, a channel through which a spindle 67 is partially introduced axially, so that the part of the spindle 67 projecting out of the tool 62 acts as a mould insert for forming the recess 26 (see FIG. 6) in the lever 25 of the root 4.

Figure 29:
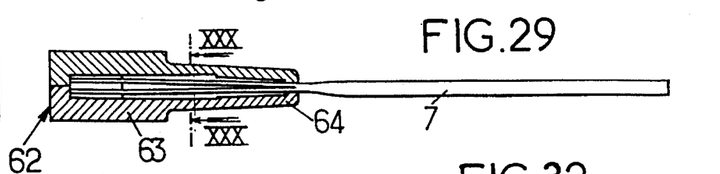
Figure 30:
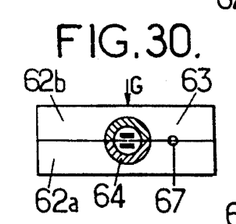
FIG. 30 is a section along XXX—XXX in FIG. 29.

The assembly constituted by the spar 7, its positioning tool 62 and the spindle 67, as represented in FIGS. 29, 30 and 31, is then fitted between the lower 61a and upper 61b parts of the open injection mould 61, after fitting the lower-surface 6a and upper-surface 6b skins in the impressions of the respectively lower 61a and upper 61b mould parts. These skins 6a and 6b, which are rigid, can be held in place in the impressions of the mould 61 by suction devices (not shown) made in a known manner in the mould parts 61a and 61b, also equipped, in a known manner, with a heating and cooling device (also not shown).

Figure 33:
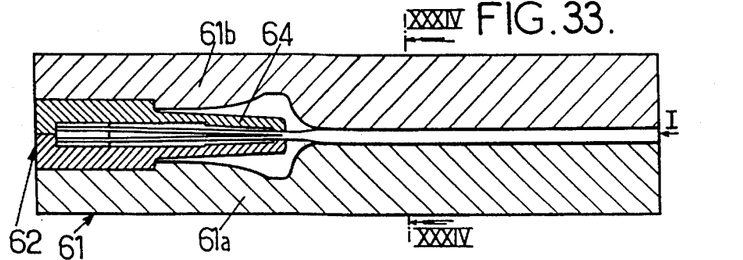
FIG. 33 represents the mould in FIG. 32 after closure.
Figure 34:
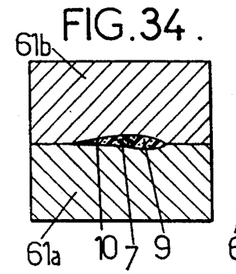
FIG. 34 is a section along XXXIV—XXXIV in FIG. 33.

The injection mould 61 is then closed, as represented in FIG. 33, so that an injection moulding cavity remains, delimited inside the skins 6a and 6b, between the latter and the spar 7, and between their casings 21a and 21b and the insert formed by the end-pieces 64 of the positioning tool 62.

The injection moulding operation is then carried out.

It is known to mould pieces made from thermoplastic reinforced with fibres by injection starting with a semi-finished product in the form of powder or granulates on an injection moulding machine and using a manufacturing cycle which includes five main steps: namely, plasticizing the material, closing the mould, filling the mould under pressure, cooling and mould release of the piece.

Since all the devices necessary for implementing these steps are known, the description of the injection moulding tooling in the present document has been limited to the injection mould 61 and the positioning tool 62, because the other devices are conventional and without innovation.

It is however pointed out that the material injection moulded is a composite material based on granulates of PEEK matrix in which short carbon fibres are embedded. These granulates of thermoplastic PEEK/carbon composite are semi-finished products available, for example, under the brand names 150CA30 or 450CA30 from the British Company ICI and its subsidiaries. They are granulates with a length of 2 to 4 mm and a diameter of 1 to 3 mm, of PEEK resin filled to approximately 30% by mass of carbon made in short fibres contained in the dry state in the PEEK resin. Before first use, these granulates are baked at a temperature of approximately 150° C. for at least three hours. These granulates are then heated to a melting temperature of the PEEK matrix, of the order of 400° C., and the composite material fluidized by melting its matrix is then injected into the closed mould 61, maintained at a temperature lying between approximately 150° C. and approximately 200° C., but preferably close to 150° C.

Injection is carried out between the ends of the skins 6a and 6b forming the blade tip 3, along the arrow I in FIG. 33, and the fluidized composite at 400° C. fills the entire free volume within the skins 6a and 6b and around the spar 7 and the end-pieces 64, thus moulding the filling bodies 9 and 10 and the collar 22 of the blade root. By the heat supplied by the material injected at approximately 400° C., local melting of the PEEK matrix of the skins 6a and 6b and of the spar 7 occurs, in their parts in contact with this injected material. Also, because of the injection pressure and of the PEI films at the interfaces between the spar 7 and the skins 6a and 6b, on the one hand, and the injected material, on the other hand, the result is that this spar 7 is bonded to the skins 6a and 6b by the injected composite which is of the same kind (same PEEK matrix and carbon fibres) with good homogeneity of the resin at the interfaces.

After injection, cooling the mould 61 and its contents then solidifies the PEEK matrix of the injected material, forming the filling bodies 9 and 10 and the collar 22, like that of the spar 7 and of the skins 6a and 6b, which are assembled with each other with good cohesion by means of the injected material.

Figure 35:
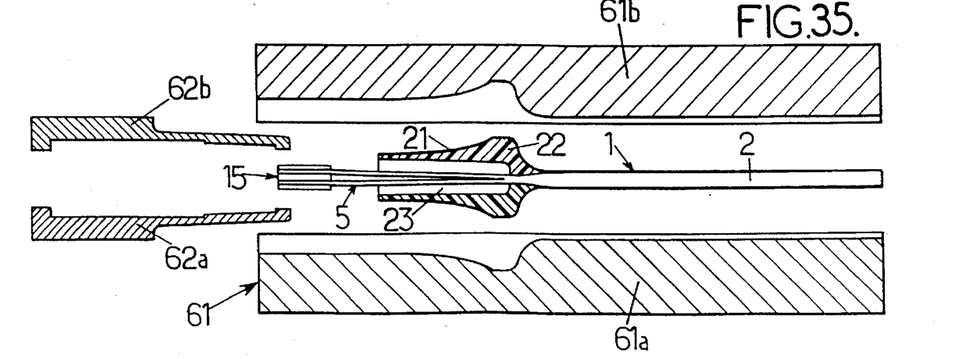
FIG. 35 represents, in longitudinal section, the opening of the mould in FIGS. 32 and 33 and the withdrawal of the positioning tool in FIGS. 28 and 29, for releasing the blade from the mould.

After cooling, opening the mould 61 and withdrawing the positioning tool parts 62a and 62b forming moulding inserts, as represented in FIG. 35, make it possible to release from the mould a blade formed by the suitably rigidified combination of the prefabricated elementary pieces (6a, 6b, 7) and of the injected components (9, 10, 22). The mechanical characteristics of the hot-injectable composite material as described and used above are actually highly satisfactory since, under conditions of use at an ambient temperature of 23° C., for example, the tensile YOUNG's modulus is 24000 MPa, and the static tensile breaking strength close to 200 MPa. It will be observed that these values are of the same order of magnitude as those of a balanced glass fabric, that is to say with the same percentage of fibres in the warp and weft directions, for example a glass fabric of type E with 55% of fibres by mass, whose YOUNG's modulus and static tensile strength are respectively of the order of 20000 MPa and 300 MPa. The composite PEEK/carbon material resulting from hot injection starting with the granulates described hereinabove therefore has remarkable characteristics for an injected material. Furthermore, these granulates contain 24% by volume of fibres and 76% by volume of PEEK resin, and their density is of the order of 1.41 to 1.44 kg/dm$^3$. The PEEK matrix has itself a tensile strength of the order of 90 to 100 MPa, and a breaking strain of 70%, a YOUNG's modulus of the order of 4000 MPa, a glass transition temperature of 143° C. and a melting temperature of 390° C. The reinforcing fibres are high-strength carbon fibres of the brand name "XAS" of the British Company COURTAULDS, with a length of the order of 0.1 to approximately 0.5 mm. The injectable thermoplastic PEEK/carbon composite thus obtained has very good static mechanical characteristics, good thermal resistance and no sensitivity to moisture-accelerated ageing.

To complete the manufacture of the blade, the metal or ceramic rings 27 and 28 are attached by bonding or crimping onto the cuff 21 of the blade released from the mould, so as to obtain a blade according to FIGS. 1 to 8.

Similarly, a cap for protecting the leading edge, made of titanium or stainless steel for example, can be attached by bonding onto the blade after release from the mould, or solidly attached to the blade during the moulding, if the impressions of the injection mould 61 are arranged accordingly and the cap is fitted in this mould before it is closed, in a suitable position with respect to the other elements which it contains.

Figure 36:
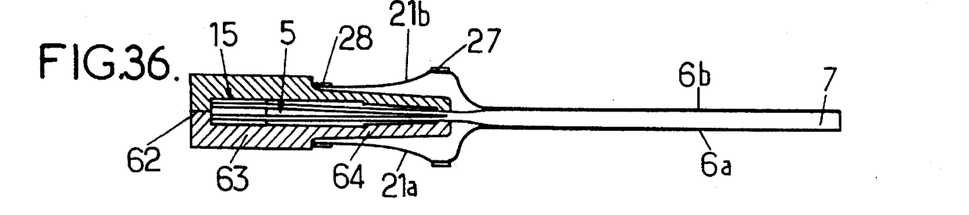
FIG. 36 is a view similar to FIG. 29 for a variant of the method of manufacture of the blade, in which the skins and rings forming rotational bearing surfaces are positioned around the spar and its positioning tool according to FIG. 29, and FIGS. 37, 38 and 39 are views respectively similar to FIGS. 32, 33 and 35 for this variant of the method.
Figure 37:
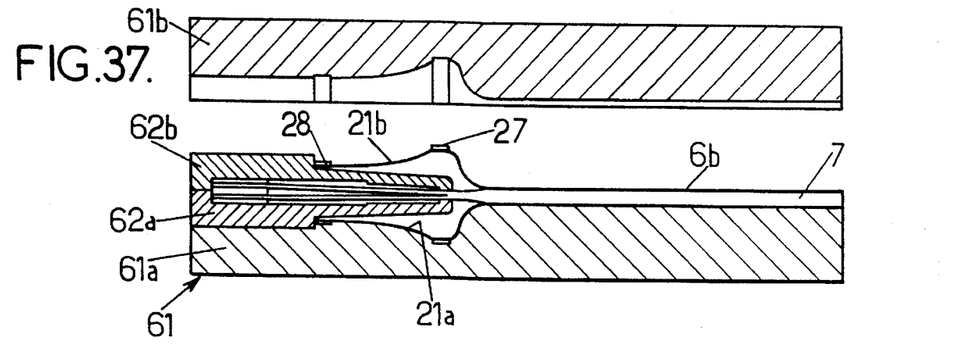
Figure 38:
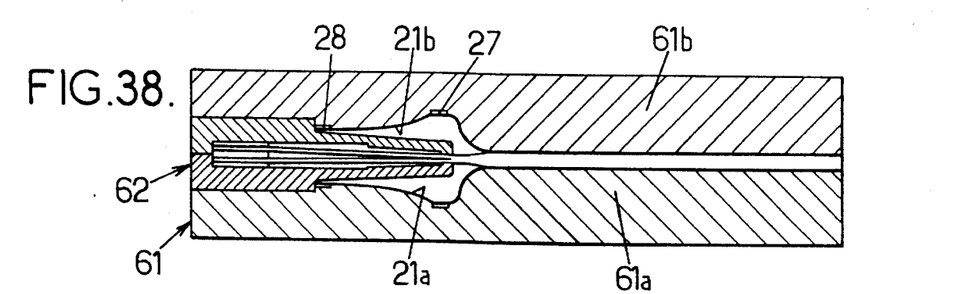

As a variant of the method represented in FIGS. 36 to 39, the rings 27 and 28 are integrated with the blade during the injection moulding step. This is obtained in the following manner: after having equipped the prefabricated and rigid elementary piece constituting the spar 7 with its positioning tool 62, which forms an injection insert, as represented in FIG. 29, the prefabricated and rigid elementary pieces constituting the lower-surface 6a and upper-surface 6b skins are fitted around the spar 7 and its positioning tool 62, arranging the rings 27 and 28 around the axial ends of the half-casings 21a and 21b intended to form the cuff 21 of the root 4, as represented in FIG. 36. In this configuration, as in that of FIG. 33, the axial ends of the half-casings 21a and 21b which are on the side of the tool 62 are applied against the annular radial shoulder of the tool 62 which surrounds the connection of the end-pieces 64 to the bases 63 of this tool 62. As represented in FIG. 37, the assembly in FIG. 36 is then arranged in the impression of the lower part 61a of the injection mould 61, which is then closed as represented in FIG. 38. Clearly, in this variant of the method, the internal impressions of the lower 61a and the upper 61b parts of the injection mould 61 are arranged to receive the rings 27 and 28.

With the mould 61 closed, the injection is carried out as before, the PEEK resin of the half-casings 21a and 21b in particular is melted by supply of heat from the same injected fluidized composite material as in the preceding example, so that subsequent cooling leads, by rigidifying the PEEK resin in contact with the rings 27 and 28, to solid attachment of these rings to the cuff 21 then formed by solidly attaching the half-casings 21a and 21b.

Figure 39:
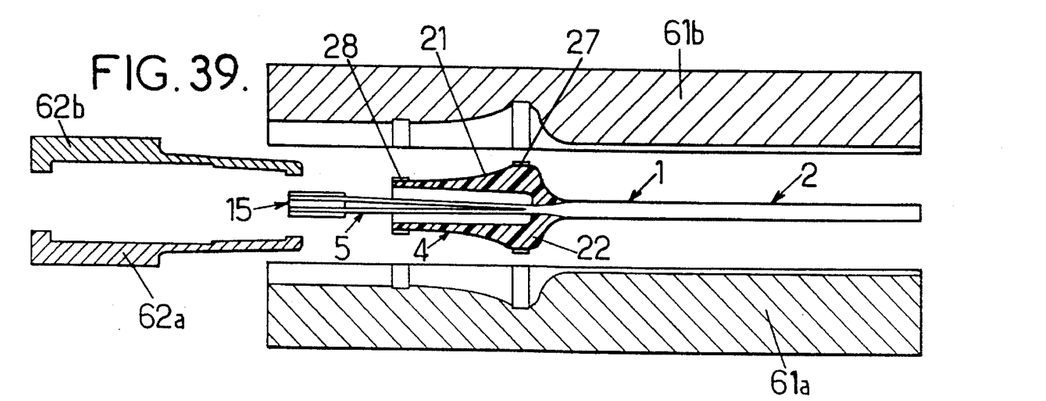

Finally, by opening the mould 61 and withdrawing the positioning tool parts 62a and 62b, the blade, identical to that in FIGS. 1 to 8, is released from the mould, as represented in FIG. 39.

The method of manufacture of the blade variant represented in FIG. 9 differs from that which has just been described only in the step of producing the prefabricated elementary piece intended to constitute the spar 37 having a rooting part 35 with loop linkage attachment 38. Such a spar 37 can be produced according to the process described with reference to FIG. 9 of the aforementioned U.S. Pat. No. 4,892,462 which is applied to other materials. According to this method, this elementary piece is produced by rolling a tape of continuous, unidirectional and longitudinal carbon fibres which are agglomerated by PEEK resin in several layers and under mechanical tension around two spools, with axes which are parallel but spaced apart by a distance greater than the span of the blade. The mechanical rolling tension may be obtained by subjecting one of the two spools to traction which tends to separate it from the other during rolling of the tape. A hank rolled in an elongated and closed loop is thus obtained, which is shaped by compacting under pressure and at a melting temperature of the PEEK matrix, of the order of 400° C., in a mould which includes an insert to hold separately the two parts of the hank which are intended to constitute the two attachment bars 37a and 37b joined together by the loop end 38 of the spar 37. After solidifying the PEEK matrix by cooling the compacting mould and its contents, the end part of the rolling situated on the side opposite the loop attachment 38 is cut out, to return the length of the spar 37 thus obtained to the length desired along the span of the blade.

The spar 37 thus produced in the form of a prefabricated elementary piece is then fitted with the other PEEK/carbon composite prefabricated components of the blade in an assembly and pressurized injection mould, as described hereinabove for the blade of FIGS. 1 to 8 with reference to FIGS. 28 to 35 and 36 to 39, obviously by adapting the positioning tool of the spar to the particular shape of its rooting part with loop attachment.

In this example as well, the rings of the blade root, as well as, optionally, the cap for protecting the leading edge are mounted on the blade by bonding or crimping, after moulding the latter, or integrated with the blade during the step of assembly and injection moulding.

We claim:

1. A blade, essentially made of composite material, for a rotorcraft rotor, comprising:

a composite rigid shell, with an aerodynamic profile, elongated longitudinally along the span of the blade, one longitudinal end of which is turnable towards a hub of the rotor and includes a blade root, said shell including at least one layer of reinforcing fibres agglomerated by a matrix comprising a synthetic rigidifying resin and laminated upper-surface and lower-surface skins extending from a leading edge to a trailing edge of the blade, each of said laminated skins comprising, from an inside towards an outside of the shell, a film of polyetherimide resin, at least one layer of plies of long and unidirectional fibres oriented substantially along a longitudinal axis of the blade, and at least one layer of fibre fabric, in which the directions of weft and warp yarns are oriented substantially at 45° with respect to the longitudinal axis of the blade;

at least one spar, having at least one part housed substantially longitudinally in the shell, including at least one elongate composite bar of continuous and unidirectional reinforcing fibres agglomerated by a matrix comprising a synthetic rigidifying resin; and at least one composite filling body arranged in the shell between an edge of the shell and the at least one spar, said at least one filling body including reinforcing fibres agglomerated by a matrix comprising a synthetic rigidifying resin, the resin of the matrices of the shell, of said at least one filling body and of each bar of said at least one spar comprising a thermoplastic resin, and said at least one filling body comprising a composite material having short reinforcing fibres agglomerated by said thermoplastic resin, said composite material joining the shell to the at least one part of said at least one spar housed in the shell.

2. The blade according to claim 1, wherein the blade root is tubular and extends the shell substantially axially, the blade root comprising two complementary half-casings, each of said half-casings comprising an extension of one of the two laminated skins respectively.

3. The blade according to claim 2, wherein the blade root includes a bearing for clamping and rotation of the blade root on the hub, said bearing comprising a blade root cuff including, projecting radially outwards, a pitch control lever for articulation to a device for collective control of pitch of blades of the rotor, the cuff being integrated with said skins and comprising said two complementary half-casings.

4. The blade according to claim 3, wherein the blade root includes an internal reinforcing collar comprising a composite of the same short reinforcing fibres embedded in the same thermoplastic resin as the at least one filling body.

5. The blade according to claim 1 wherein the at least one part of the at least one spar bar which is housed in said shell is surrounded by a film of polyetherimide resin.

6. A method for manufacturing a blade for a rotorcraft rotor comprising a composite shell having a lower-surface skin and an upper-surface skin which are laminated, at least one spar housed substantially longitudinally in the shell and a blade root, the method comprising the steps of:

producing each of the laminated skins and the spar of thermoplastic composite of the blade in a form of a prefabricated elementary piece;

arranging the prefabricated elementary pieces in an injection and pressurized assembly mould, comprising a lower mould part and an upper mould part including complementary internal impressions, having respectively the shape of the lower-surface skin and of the upper-surface skin of the blade, such that said prefabricated elementary pieces occupy, in the mould, the respective positions which they occupy in the blade;

closing the mould and injecting therein, between said skins, a fluid composite material of short reinforcing fibres embedded in a thermoplastic matrix heated to a melting temperature, to form at least one filling body;

at least locally melting the matrix of said prefabricated elementary pieces arranged in the mould, in their parts in contact with the fluid composite material;

cooling the mould to solidify the thermoplastic matrix of the injected composite material and of said elementary pieces, and to rigidify a combination of the elementary pieces and of the injected body; and releasing the blade thus obtained from the mould.

7. The method according to claim 6, further comprising heating said mould to a temperature lower than a melting temperature of the thermoplastic matrix during the step of injecting, and at least locally melting the matrix of said elementary pieces by contact with said fluid composite material injected into the mould.

8. The method according to claim 6, further comprising the step of arranging rings around parts, forming said blade root, of said skins arranged on each other in said mould before said step of closing, in order to assemble said skins with the blade during the moulding.

9. The method according to claim 6, further comprising the step of producing the elementary piece comprising the laminated lower-surface or upper-surface skin of the shell by shaping by stamping, between two mould parts held at a temperature lower than a melting temperature of the matrix, and having complementary impressions corresponding to a shape of one of the laminated skins, of a panel preheated to a melting temperature of the matrix, having the shape, developed flat, of the laminated skin, and cut out from a precompacted plate obtained by stacking several layers of at least one of fabrics and plies of continuous and unidirectional reinforcing fibres agglomerated by the matrix and of a polyetherimide film, under pressure and at the melting temperature of the matrix, then rigidifying in a plate by solidifying the matrix by cooling.

10. The method according to claim 6 for manufacturing a blade wherein a part external to the shell comprises a blade rooting part having two attachment bars forming a loop attachment for linking to a hub of said rotor, extending the at least one spar bar housed in the shell, the method further comprising the step of producing the elementary piece comprising said at least one spar by rolling a tape of continuous and unidirectional reinforcing fibres which are agglomerated by said thermoplastic matrix in several layers and under mechanical tension around two spools, shaping in a mould by compacting the winding under pressure and at a melting temperature of the matrix, followed by solidification cooling of the matrix, and cutting out an end part of the winding on a side opposite the loop attachment.

11. The method according to claim 6, for manufacturing a blade wherein a part external to the shell comprises a blade rooting part having at least one attachment bar, in which an end portion for linkage to a hub of said rotor is fitted with a laminate attachment, also comprising thermoplastic composite, and extending said at least one spar bar housed in the shell, the method further comprising the step of producing the elementary piece comprising the at least one spar by producing each attachment bar and the spar bar in the form of a strip of continuous and unidirectional reinforcing fibres which are agglomerated by said thermoplastic matrix, obtained by pultrusion at a melting temperature of the matrix, of several plies of continuous and unidirectional fibres which are agglomerated by said matrix, and, if said rooting part comprises at least two attachment bars, each one of which respectively extends one spar bar, in superimposing parts of corresponding strips forming the spar part housed in the shell, with interposition of at least one ply of continuous and unidirectional fibres which are agglomerated by said matrix between the adjacent superimposed strip parts, and fitting a removable tool, in the shape of a wedge, between parts held spaced from each other of two neighbouring strips, to form two attachment bars of the rooting part, then arranging the strips in a mould, and inserting each linkage end portion of a pultruded strip between two laminate elements of the attachment, to superimpose all the laminate elements of the attachment, closing the mould and compacting its contents under pressure and at a melting temperature of said thermoplastic matrix, and solidifying the matrix by cooling to rigidify the spar thus obtained with the laminate attachment solidly attached to its rooting part.

12. The method according to claim 11, further comprising producing each laminate element of the laminate attachment made of thermoplastic composite by stacking at least one of several layers of fabric and of plies of continuous and unidirectional fibres agglomerated by said thermoplastic matrix, by compacting the stack thus obtained under pressure and at a melting temperature of the matrix, solidifying the matrix by cooling to obtain a compacted plate, and cutting out said laminate element from said compacted plate.

13. A blade, essentially made of composite material, for a rotorcraft rotor, comprising:

a composite rigid shell, with an aerodynamic profile, elongated longitudinally along the span of the blade, one longitudinal end of which is turnable towards a hub of the rotor and includes a blade root, said shell including at least one layer of reinforcing fibres agglomerated by a matrix comprising a synthetic rigidifying resin;

at least one spar, having at least one part housed substantially longitudinally in the shell, including at least one elongate composite bar of continuous and unidirectional reinforcing fibres agglomerated by a matrix comprising a synthetic rigidifying resin; and at least one composite filling body arranged in the shell between an edge of the shell and the at least one spar, said at least one filling body including reinforcing fibres agglomerated by a matrix comprising a synthetic rigidifying resin, the resin of the matrices of the shell, of said at least one filling body and of each bar of said at least one spar comprising a thermoplastic resin, and said at least one filling body comprising a composite material having short reinforcing fibres agglomerated by said thermoplastic resin, said composite material joining the shell to the at least one part of said at least one spar housed in the shell.

14. The blade according to claim 13, wherein the thermoplastic resin comprises a polyetheretherketone resin, and the reinforcing fibres are selected from the group consisting of carbon and glass fibres.

15. The blade according to claim 14, wherein the reinforcing fibres of the shell, of the at least one composite filling body and of the at least one composite bar of said at least one spar comprise carbon.

16. The blade according to claim 13, further comprising a blade rooting part including at least one blade attachment bar which is elongate, composite, and twistable about a longitudinal axis, and extends outside the shell by passing through the blade root, the at least one composite bar of the at least one spar having a longitudinal axis substantially parallel to the longitudinal axis of the blade, the end of the at least one attachment bar, on the side opposite the shell, being arranged in linkage attachment to the rotor hub, the at least one attachment bar of the rooting part being integral with the at least one composite bar of the at least one spar and comprising reinforcing fibres agglomerated by the thermoplastic resin.

17. The blade according to claim 16, wherein the at least one spar comprises a hank of continuous and unidirectional reinforcing fibres agglomerated by said thermoplastic resin, and includes two parts substantially parallel to each other and to the longitudinal axis of the blade, which constitute two spar bars received in the shell and joined to each other by a substantially flattened loop part which comprises the rooting part, of which an end rolled into a loop forms a loop attachment for linkage to the hub, to surround a bush by which the blade is individually and removably attachable to the hub by a bolt, said loop attachment being connected to said two spar bars received in the shell by two hank parts forming two attachment torsion bars of the rooting part.

18. The blade according to claim 16, wherein the attachment for linking the at least one attachment bar to the hub comprises a laminate attachment, comprising at least two laminate elements between which an end linkage portion of the attachment bar, on the side opposite the shell, is sandwiched and solidly attached, each of said laminate elements comprising a stack of at least two layers of the same reinforcing fibres as those of the attachment bar, agglomerated by said thermoplastic resin which solidly attaches said laminate elements to said end linkage portion, the laminate attachment being shaped to abut, towards the shell, against movable means for holding the laminate attachment and the blade to the hub.

19. The blade according to claim 18, wherein the at least one attachment bar comprises at least one pultruded strip of continuous and unidirectional fibres in said thermoplastic resin, said unidirectional fibres being oriented substantially along the longitudinal axis of the attachment bar, each of the laminate elements of the laminate attachment comprising a stack of several layers of crossed plies of at least one of continuous and unidirectional fibres and layers of fibre fabric, such that directions of the fibres are substantially at 45° with respect to the longitudinal axis of the attachment bar.

* * * * *